(12) United States Patent
Sato

(10) Patent No.: US 7,800,670 B2
(45) Date of Patent: Sep. 21, 2010

(54) IMAGE PICKUP APPARATUS AND IMAGE PICKUP METHOD

(75) Inventor: Yutaka Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 969 days.

(21) Appl. No.: 11/132,026

(22) Filed: May 18, 2005

(65) Prior Publication Data
US 2005/0264663 A1    Dec. 1, 2005

(30) Foreign Application Priority Data
May 19, 2004    (JP)    ............................. 2004-148934

(51) Int. Cl.
H04N 3/14    (2006.01)
H04N 9/73    (2006.01)
H04N 5/217    (2006.01)
H04N 5/262    (2006.01)
H04N 5/20    (2006.01)

(52) U.S. Cl. .................... 348/297; 348/226.1; 348/241; 348/236; 348/255

(58) Field of Classification Search .................. 348/297, 348/222.1, 241, 226.1, 227.1, 228.1, 230.1, 348/350, 238, 236, 370, 255, 607, 364, 366, 348/229.1, 167, 168; 382/167, 168
See application file for complete search history.

(56) References Cited

U.S. PATENT DOCUMENTS

| | | | |
|---|---|---|---|
| 6,295,085 B1 * | 9/2001 | Munson et al. | 348/226.1 |
| 6,900,834 B2 * | 5/2005 | Henderson et al. | 348/226.1 |
| 7,106,368 B2 * | 9/2006 | Daiku et al. | 348/226.1 |
| 7,280,135 B2 * | 10/2007 | Kim | 348/228.1 |
| 7,420,595 B2 * | 9/2008 | Kim et al. | 348/226.1 |
| 2004/0179114 A1 * | 9/2004 | Silsby et al. | 348/226.1 |
| 2005/0206745 A1 * | 9/2005 | Daiku et al. | 348/226.1 |

FOREIGN PATENT DOCUMENTS

| | | |
|---|---|---|
| JP | 63 308484 | 12/1988 |
| JP | 5 75929 | 3/1993 |
| JP | 5 336451 | 12/1993 |
| JP | 9 247550 | 9/1997 |
| JP | 2003 209750 | 7/2003 |
| JP | 2003333423 A * | 11/2003 |

* cited by examiner

*Primary Examiner*—Tuan Ho
*Assistant Examiner*—Marly Camargo
(74) *Attorney, Agent, or Firm*—Frommer Lawrence & Haug LLP; William S. Frommer; Thomas F. Presson

(57) ABSTRACT

An image pickup apparatus is disclosed which can remove noise with certainty from an image pickup signal while a high resolution of the image pickup signal is assured regardless of a reading out method of the image pickup signal and achieve reduction of the cost. A light receiving face of a solid-state image pickup device has an image pickup region from which a detection signal corresponding to an image of an image pickup subject formed from light incoming to the light receiving face is outputted as an image pickup signal and a light amount detection region from which a detection signal corresponding to the amount of the light incoming to the light receiving face is outputted as a light amount detection signal. A signal processing circuit of a signal processing section processes the image pickup signal to produce a video signal. A detection circuit detects cyclic variation of the luminosity of a light source from the light amount detection signal. A control section controls the signal processing circuit and issues an instruction to a control circuit in response to a result of the detection by the detection circuit.

17 Claims, 8 Drawing Sheets

IMAGE PICKUP APPARATUS AND IMAGE PICKUP METHOD

BACKGROUND OF THE INVENTION

This invention relates to an image pickup apparatus and an image pickup method.

A solid-state image pickup device photoelectrically converts light incoming to a light receiving face thereof to produce charge and cumulatively stores the charge in accordance with a charge storage time period set in advance and then outputs an image pickup signal corresponding to the stored character. A solid-state image pickup device of the type described includes pixels arranged in rows and columns, that is, in a matrix, to perform photoelectric conversion.

Where the solid-state image pickup device is formed from CMOS sensors, reading out of image pickup signals from the individual pixels is performed either such that the image pickup signals are read out successively in a unit of a row (line) in which the pixels are arranged or in a focal plane fashion wherein the image pickup signals are read out successively in a unit of a single pixel.

It is known that, if an image pickup apparatus having such CMOS sensors as described above is used under light emitted from a light source using a commercial power supply, then when the charge storage time of the CMOS sensors is not equal to an integral number of times the cycle of variation of the luminosity of light of the light source, noise in the form of stripes which extend in a horizontal direction appears on a screen (frame) formed from an image pickup signal outputted from the CMOS sensors.

An image pickup apparatus which eliminates such a disadvantage as just described has been proposed, for example, in Japanese Patent Laid-Open No. 2003-333423. The image pickup apparatus includes a light amount detector for detecting cyclic variation of the luminosity of light of a light source, and an A/D converter for converting a detection signal of the light amount detector into a digital signal. The image pickup apparatus further includes a correction circuit for correcting the image pickup signal outputted from CMOS sensors and converted into a digital signal based on a cycle of variation of the detection signal supplied from the A/D converter.

The correction circuit includes a gain amplifier (multiplier) and adjusts the amplification factor of the gain amplifier in response to the detection signal supplied thereto from the A/D converter to correct the level of the image pickup signal.

SUMMARY OF THE INVENTION

However, with the image pickup apparatus described above, increase of the noise amount and deterioration of the resolution of the image pickup signal by amplification by the gain amplifier cannot be avoided, and there is the possibility that the S/N ratio of an image formed from the image pickup signal may drop or the smoothness in gradation of the image may drop.

Further, in order to correct the image pickup signal using the gain amplifier, it is necessary to provide an A/D converter for the detection signal and wiring lines for transmitting the detection signal converted into a digital signal to the correction circuit in addition to the gain amplifier. Therefore, increase of the number of parts and complication in configuration cannot be avoided, and there is a disadvantage in achievement of the reduction in cost.

The image pickup apparatus described above further has a subject in that, when an electronic zoom function of enlarging an image of part of a region of the image pickup device operates, a correction function of the gain amplifier becomes complicated, which makes the correction difficult.

Furthermore, in the image pickup apparatus described above, where the solid-state image pickup device is applied so as to output the image pickup signal for every one frame like a CCD unit, the amplification factor is changed for every frame by means of the gain amplifier. However, decrease of the smoothness in gradation by increase of the noise amount or degradation of the resolution occurs with the frame of an increased amplification factor.

It is desirable to provide an image pickup apparatus which can remove noise with certainty from an image pickup signal while a high S/N ratio and a high resolution of the image pickup signal are assured regardless of a reading out method of the image pickup signal and is advantageous also in achievement of reduction of the cost.

According to the present invention, the desire described above is achieved by providing an image pickup region and a light amount detection region on a light receiving face of a solid-state image pickup device and setting an image pickup charge storage time period of the image pickup region and a light amount detection charge storage time period of the light amount detection region independently of each other.

In particular, according to the present invention, there is provided an image pickup apparatus, including a solid-state image pickup device for photoelectrically converting light incoming to a light receiving face thereof to produce charge such that the charge is cumulatively stored in response to a charge storage time period set in advance and outputting a detection signal corresponding to the stored charge, and a control section for setting the charge storage time period, the light receiving face of the solid-state image pickup device having an image pickup region from which a detection signal corresponding to an image of an image pickup subject formed from the light incoming to the light receiving face is outputted as an image pickup signal and a light amount detection region from which a detection signal corresponding to the amount of the light incoming to the light receiving face is outputted as a light amount detection signal, the charge storage time period including two time periods of an image pickup charge storage time period which is a charge storage time period of the image pickup region and a light amount detection charge storage time period which is a charge storage time period of the light amount detection region, the control section setting the image pickup charge storage time period and the light amount detection charge storage time period independently of each other.

In the image pickup apparatus, the image pickup charge storage time period of the image pickup region and the light amount detection charge storage time period of the light amount detection region of the solid-state image pickup device can be set independently of each other. Therefore, where the luminosity of light emitted from the light source has a fixed variation cycle, the light amount detection charge storage time period is set to a period of time different from an integral number of times the variation cycle and it is decided whether or not the light amount detection signal cyclically varies in the variation cycle. Then, if it is decided that the light amount detection signal cyclically varies in the variation cycle, then the image pickup charge storage time period is set to a period of time equal to an integral number of times the variation cycle. Consequently, the sum of the light amount within the image pickup charge storage time period can be made equal among image pickup pixels in the image pickup region.

Consequently, when image pickup is performed under a light source whose luminosity varies cyclically, horizontal striped noise can be prevented with certainty from appearing on the screen on which the image is formed.

Further, since, different from the prior art, no correction of an image pickup signal by a gain amplifier is involved, the configuration is simple, and this is advantageous also in achievement of reduction of the cost. Further, since a gain amplifier which amplifies an image pickup signal in a unit of a line or in a unit of a pixel is not used, increase of the amplification factor of the gain amplifier can be prevented even where the solid-state image pickup device is applied such that reading out of the image pickup signal therefrom is performed through an exposure timing which is same for every one frame.

Further, where the image pickup charge storage time period is set to a value equal to an integral number of times of the variation cycle under the environment of a light source whose luminosity varies cyclically, when the environment of the light source changes and now the luminosity does not vary cyclically, the image pickup charge storage time period can be set to a period of time different from an integral number of times the variation period.

BRIEF DESCRIPTION OF THE DRAWINGS

These and other objects of the invention will be seen by reference to the description, taken in connection with the accompanying drawings, in which.

DETAILED DESCRIPTION OF THE PREFERRED EMBODIMENTS

Figure 1:
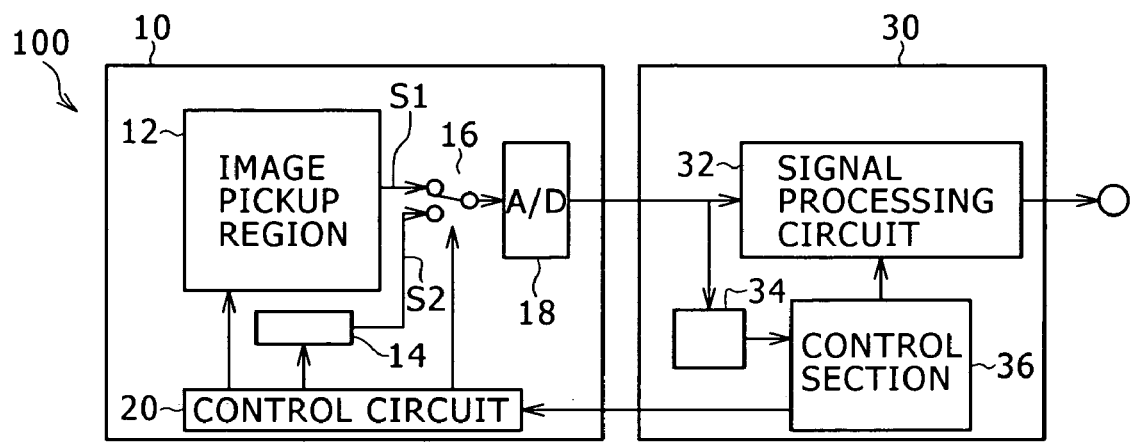
FIG. 1 is a block diagram showing an image pickup apparatus according to a first embodiment of the present invention.

Referring first to FIG. 1, there is shown a configuration of an image pickup apparatus according to a first embodiment of the present invention. The image pickup apparatus 100 shown includes a solid-state image pickup device 10 formed from CMOS sensors, and a signal processing section 30.

Figure 2:
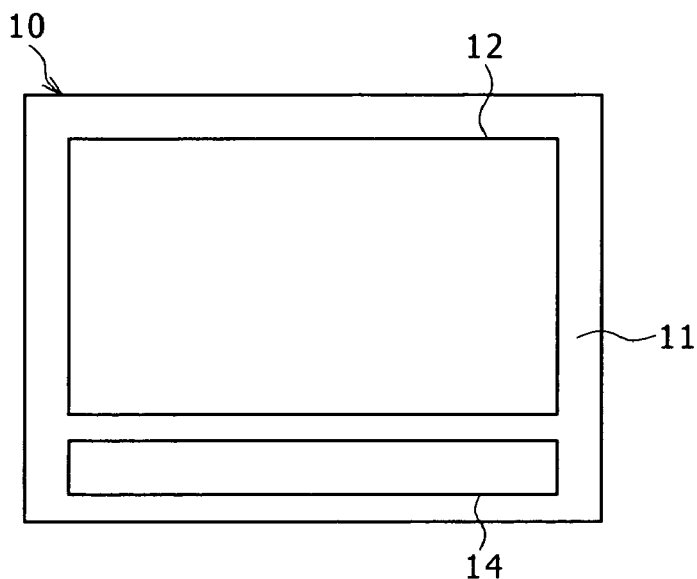
FIG. 2 is a schematic view showing the light receiving face of a solid-state image pickup device shown in FIG. 1.

Referring to FIG. 2, the solid-state image pickup device 10 includes a light receiving face 11 to which light of an image pickup subject introduced by an image pickup optical system (not shown) comes in. The light receiving face 11 photoelectrically converts the incoming light to generate charge, cumulatively stores such charge for a charge storage time period set in advance, and then outputs a detection signal corresponding to the stored charge.

The light receiving face 11 includes an image pickup region 12 and a light amount detection region 14. The image pickup region 12 outputs a detection signal corresponding to an image of an image pickup object formed by light incoming to the light receiving face 11 as an image pickup signal 51. The light amount detection region 14 outputs a detection signal corresponding to the amount of light incoming to the light receiving face 11 as a light amount detection signal S2.

In the present embodiment, each of the image pickup region 12 and the light amount detection region 14 has a rectangular shape, and the light amount detection region 14 is positioned adjacent to one side of the image pickup region 12 and has an area smaller than that of the image pickup region 12. Further, reading out operations of the image pickup signal S1 and the light amount detection signal S2 from the image pickup region 12 and the light amount detection region 14, respectively, are performed independently of each other.

The image pickup signal S1 and the light amount detection signal S2 are switched by a switch 16 under the control of a control circuit 20 and supplied to an A/D converter 18.

The A/D converter 18 converts the image pickup signal S1 or the light amount detection signal S2 supplied thereto from the switch 16 from an analog signal into a digital signal and supplies the digital signal to the signal processing section 30.

The control circuit 20 controls switching of the switch 16 and controls reading out from the image pickup region 12 and the light amount detection region 14. The control circuit 20 is configured so as to set the storage time period of charge for image pickup and the storage time period of charge for light amount detection of the solid-state image pickup device 10 hereinafter described independently of each other. The control circuit 20 may be formed, for example, from a microcomputer.

In the present embodiment, the image pickup signal S1 and the light amount detection signal S2 are cut and divided with respect to time and successively outputted along the same path from the solid-state image pickup device 10 through switching of the switch 16. In other words, the image pickup signal S1 and the light amount detection signal S2 are successively outputted through the same path by separate reading out operations from each other.

The signal processing section 30 includes a signal processing circuit 32, a detection circuit 34 and a control section 36.

The signal processing circuit 32 processes the image pickup signal S1 in the form of a digital signal supplied thereto from the A/D converter 18 to produce a video signal complying with a definition. It is to be noted that such production of a video signal as just mentioned is performed using a known technique in related art and do not have a relationship to the subject matter of the present invention. Therefore, detailed description of the same is omitted herein.

The detection circuit 34 detects cyclic variation of the luminosity of the light source from the light amount detection signal S2 in the form of a digital signal supplied thereto from the A/D converter 18.

The control section 36 controls the signal processing circuit 32 and issues an instruction to the control circuit 20 based on a result of detection of the detection circuit 34. The control section 36 may be formed from, for example, a microcomputer.

In the present embodiment, the control circuit 20, signal processing circuit 32, detection circuit 34 and control section 36 cooperatively function as a control section, and the control circuit 20, detection circuit 34 and control section 36 cooperative function as a setting section. Further, the signal processing circuit 32 functions as a signal processing section.

Figure 3:
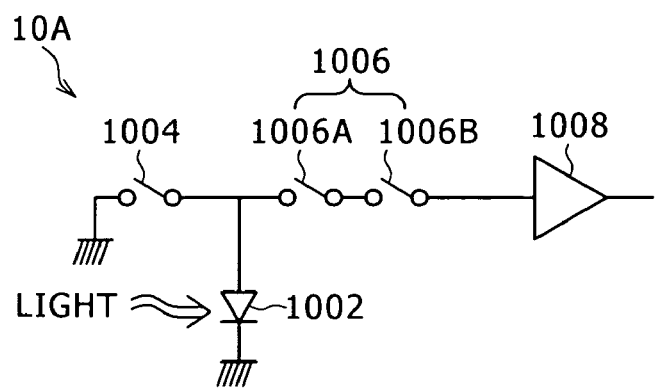
FIG. 3 is a circuit diagram illustrating the principle of a photoelectric conversion section of the solid-state image pickup apparatus shown in FIG. 1.

Now, the pixels forming the image pickup region 12 of the solid-state image pickup device 10 are described with reference to FIG. 3. It is to be noted that also the pixels forming the light amount detection region 14 are configured similarly to the pixels forming the image pickup region 12.

In the present embodiment, a plurality of pixels 10A are formed in a matrix in the direction of a row and the direction of a column. The pixels 10A are scanned in the direction of a row and the direction of a column in accordance with an X-Y addressing method to read out charge (signal charge) stored in the pixels 10A as a detection signal (image pickup signal S1 or light amount detection signal S2).

Each of the pixels 10A includes a photodiode 1002, a charge sweep-out switch 1004, a charge reading out switch 1006 and an amplifier 1008.

The photodiode 1002 receives and photoelectrically converts light into charge.

The charge sweep-out switch 1004 is interposed between the anode of the photodiode 1002 and a reference potential (ground level) and sweeps out the charge (signal charge) produced by the photodiode 1002 to the ground thereby to reduce the charge stored in the pixel 10A to zero.

The charge reading out switch 1006 is connected to the anode of the photodiode 1002 and outputs the charge produced by the photodiode 1002 when the charge reading out switch 1006 is switched on. Consequently, the charge stored in the pixel 10A is outputted as a signal.

In the present embodiment, the charge reading out switch 1006 includes two switches, that is, a switch 1006A inserted in the direction of a row according to the X-Y addressing scanning method and another switch 1006B inserted in the direction of a column according to the X-Y address scanning method.

The amplifier 1008 amplifies the charge read out through the charge reading out switch 1006, that is, the signal described above, to produce and output a detection signal.

Figure 4:
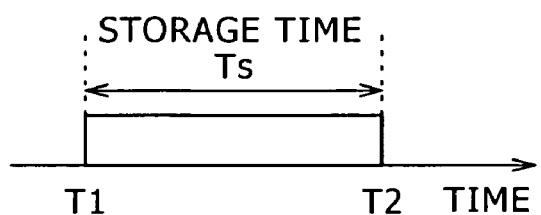
FIG. 4 is a diagrammatic view illustrating charge storage time periods of the photoelectric conversion section of FIG. 3.

Referring to FIG. 4, a charge storage time period is given as a time interval Ts from a timing T1 at which the charge sweep-out switch 1004 is switched on once to set the detection signal to 0 to another timing T2 at which the charge reading out switch 1006 is switched on to read out the signal.

In the present embodiment, the charge storage time period of the pixels of the image pickup region 12 is referred to as image pickup charge storage time period, and the charge storage time period of the pixels of the light amount detection region 14 is referred to as light amount detection charge storage time period. Thus, the charge storage time period of the solid-state image pickup device 10 is formed from the two of the image pickup charge storage time period and the light amount detection charge storage time period.

Setting of the image pickup charge storage time period and setting of the light amount detection charge storage time period by the control circuit 20 are performed by control of the on and off timings of the charge sweep-out switch 1004 and the charge reading out switch 1006.

Operation of production of the image pickup signal S1 and the light amount detection signal S2 by the solid-state image pickup device 10 is further described.

Figure 5:
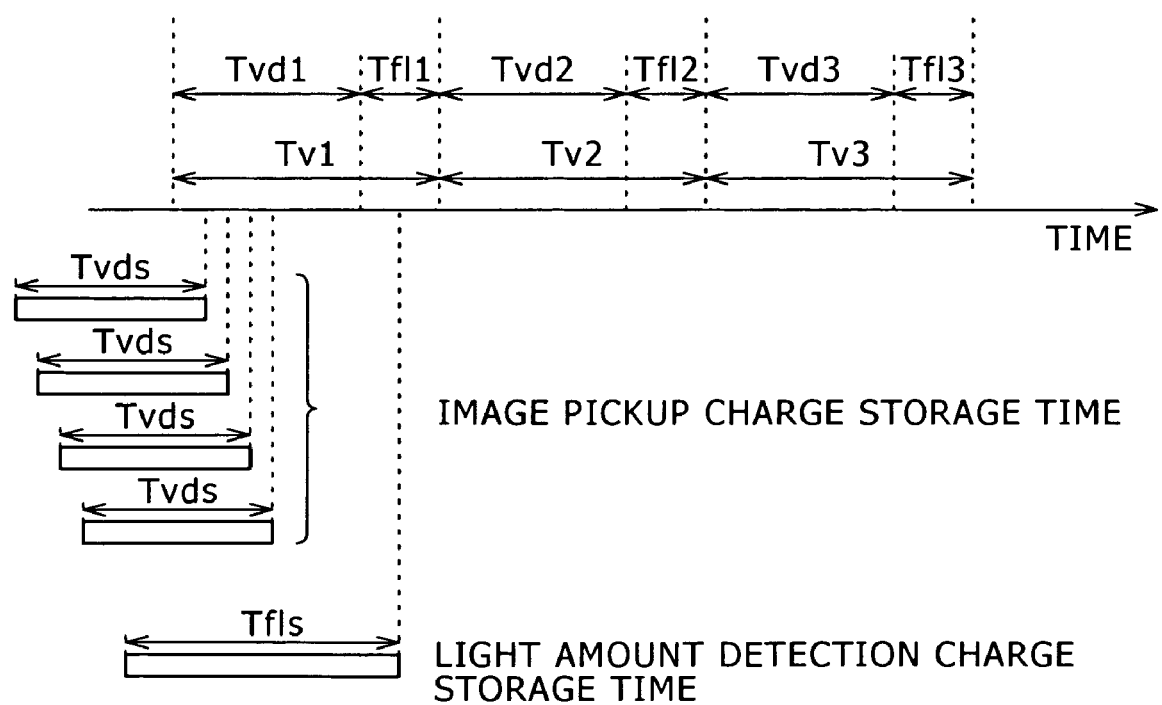
FIG. 5 is a diagrammatic view illustrating operation of the image pickup apparatus of FIG. 1.

Referring to FIG. 5, reference characters Tv1, Tv2 and TV3 individually denote periods of time for one frame of the video signal outputted from the signal processing circuit 32.

The frame time period Tv1 is composed of a time period Tvd1 for reading out the image pickup signal S1, which is effective as an image, and a time period Tfl1 for reading out the light amount detection signal S2. Similarly, the frame time period Tv2 is composed of a time period Tvd2 for reading out the image pickup signal S1, which is effective as an image, and a time period Tfl2 for reading out the light amount detection signal S2. The frame time period Tv3 is composed of a time period Tvd3 for reading out the image pickup signal S1, which is effective as an image, and a time period Tfl3 for reading out the light amount detection signal S2.

Setting of the time periods Tvd1, Tvd2, Tvd3, . . . for reading out the image pickup signal S1 and the time periods Tfl1, Tfl2, Tfl3, . . . for reading out the light amount detection signal S2 is performed by controlling an interval of time after which the switch 16 is to be changed over. In other words, the remaining time of the frame time period Tv1, Tv2, Tv3, . . . except the time period Tvd1, Tvd2, Tvd3, . . . for reading out the image pickup signal S1 is allocated as the time period Tfl1, Tfl2, Tfl3, . . . for reading out the light amount detection signal S2.

Reference character Tvds denotes the image pickup charge storage time period. The charge storage time period is for the pixels (hereinafter referred to as effective region pixels) of the image pickup region 12 from which an effective video signal is obtained. In the case of the CMOS sensors, since charge of the pixels is read out successively, the image pickup charge storage time periods Tvds are displaced by a fixed interval of time from each other.

As described hereinabove, the charge sweep-out switch 1004 is first switched on to reduce the charge in the pixel to zero. After the image pickup charge storage time period Tvds elapses, the switches 1006A and 1006B of the charge reading out switch 1006 are successively switched on to read out the charge of the pixel. Consequently, an image pickup signal S1 is outputted.

Reference character Tfls is the light amount detection charge storage time period described hereinabove. The charge storage time period is for the pixels (hereinafter referred to as light amount detection pixels) of the light amount detection region 14.

As described hereinabove, the charge sweep-out switch 1004 is first switched on to reduce the charge of the pixel to zero. After the light amount detection charge storage time period Tfls elapses, the switches 1006A and 1006B of the charge reading out switch 1006 are successively switched on to read out the charge of the pixel. Consequently, a light amount detection signal S2 is outputted.

It is to be noted that the light amount detection charge storage time period is controlled so that the light amount detection signal S2 inputted to the A/D converter 18 may not be saturated.

Further, reading out of the image pickup signal S1 is performed for every one pixel, that is, once from each one pixel in one frame, and reading out of the light amount detection signal S2 is performed at a timing always delayed by a fixed interval of time from the phase of, for example, starting of a vertical synchronizing signal corresponding to each frame.

Now detection of cyclic variation of the luminosity of the light source by the detection circuit 34 is described.

The detection circuit 34 receives the light amount detection signal S2 as an input thereto and detects whether or not there is a periodicity of variation of the luminosity of the light source. The detection circuit 34 outputs a result of the detection to the control section 36.

A factor of the variation of the luminosity of the light source is a frequency of the ac power supply (commercial power supply) supplied to the light source. Since the frequency of the variation of the luminosity of the light source is usually equal to twice the frequency of the power supply because the voltage of the ac power supply exhibits its maximum twice within one cycle.

The detection circuit 34 includes, for example, a band pass filter (BPF) formed so as to have a pass band whose center frequency is equal to twice that of the ac power supply. The control section 36 decides whether or not the light source varies cyclically based on the magnitude of the cyclic variation of the signal having passed through the detection circuit 34. It is to be noted that the detection circuit 34 is not limited to that of the type using a BPF but various known circuits can naturally be applied as such.

Figure 6A:
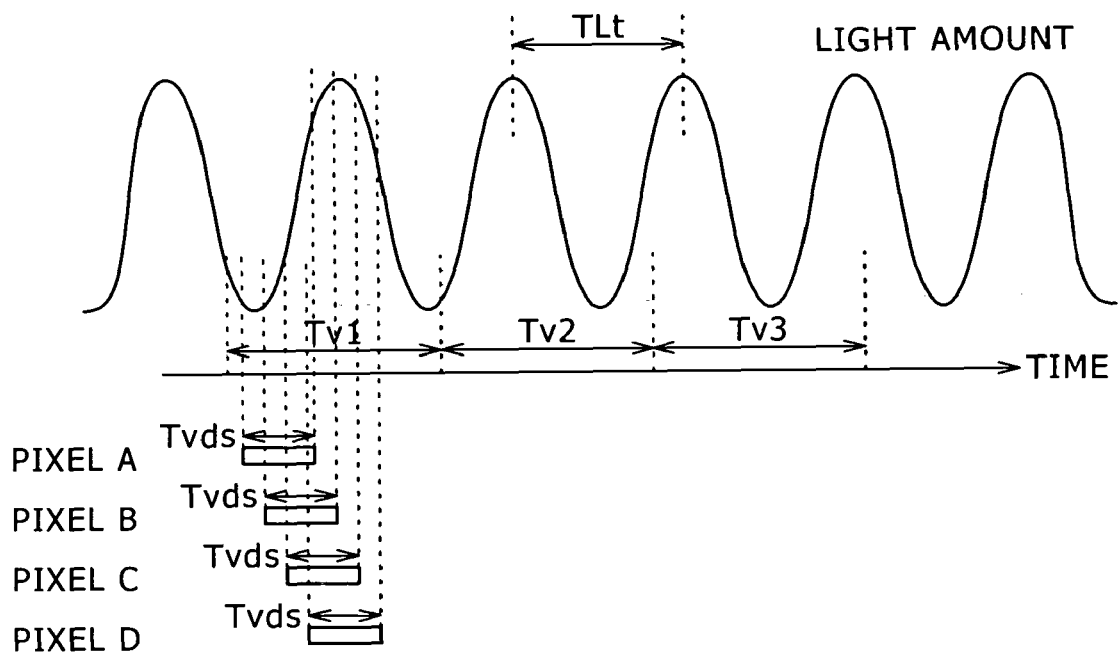
FIGS. 6A, 6B and 7A, 7B are diagrammatic views illustrating relationships between a variation cycle of the luminosity of a light source and a charge storage time period.
Figure 6B:
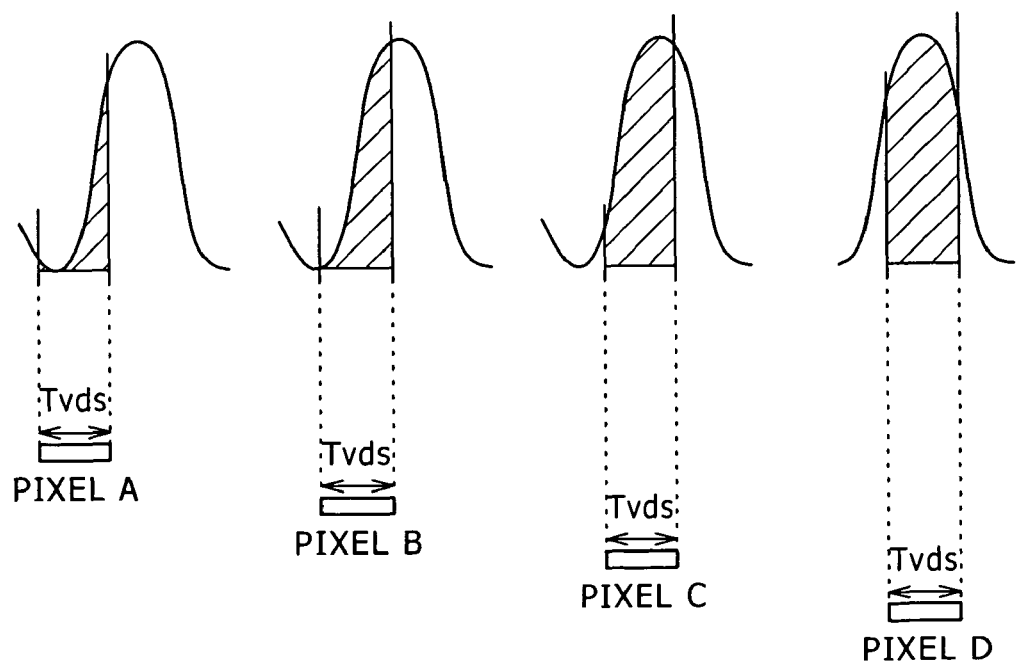

FIG. 6A illustrates a relationship between the light amount and the charge storage time period of pixels. FIG. 6B illustrates charge amounts stored in the pixels shown FIG. 6A. The image pickup charge storage time period Tvds is different from and is not equal to an integral number of times the cycle TLt of variation of the luminosity of the light source. In other words, the image pickup charge storage time period Tvds is equal to a number of times which is a real number having a digit after the decimal point (for example, 1.1 times, 2.5 times, or 4/3 times) the cycle TLt of variation of the luminosity of the light source.

Even if the image pickup charge storage time periods Tvds for the pixels A, B, C, D, . . . are equal to one another as seen in FIG. 6A, the sum of the light amount within the image pickup charge storage time period Tvds differs depending upon the timing at which charge is read out among the pixels A, B, C, D, . . . as seen in FIG. 6B. Therefore, even if an image of an image pickup subject portion of an equal light amount is picked up, the output levels of the image pickup signal S1 obtained from the pixels A, B, C, D are different from one another, and as a result, such differences as horizontal striped noise appear on the screen.

Figure 7A:
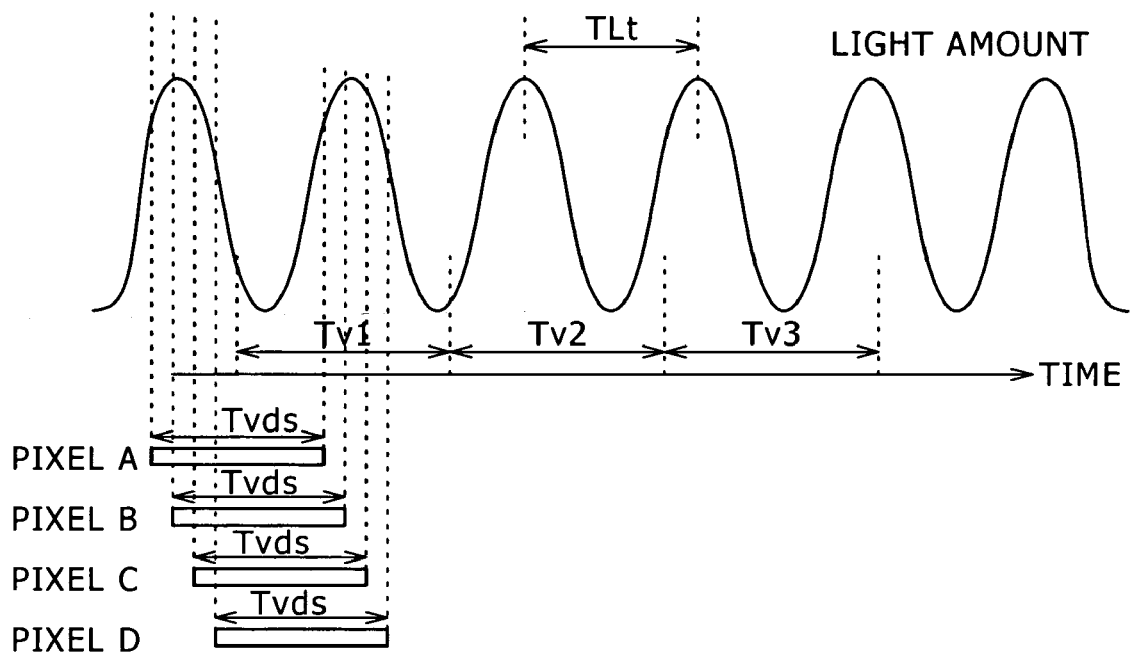
Figure 7B:
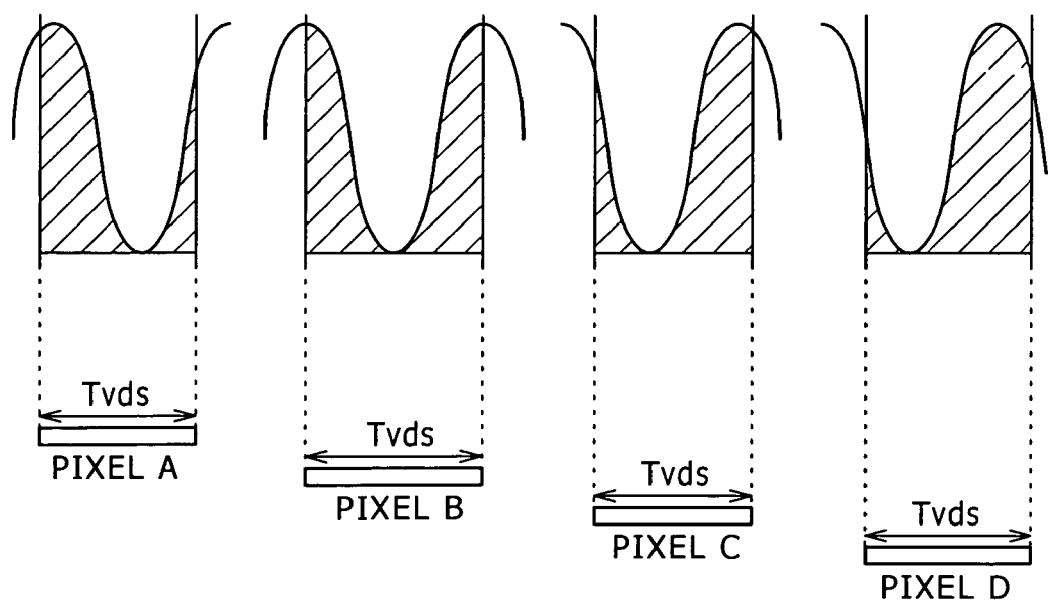

FIG. 7A illustrates a relationship between the light amount and the charge storage time period of pixels where the image pickup charge storage time period Tvds is equal to an integral number of times the cycle TLt of variation of the luminosity of the light source, for example, one time, two times, three times, . . . . FIG. 7B illustrates charge amounts stored in the pixels shown in FIG. 7A.

As seen in FIG. 7A, the image pickup charge storage time periods Tvds for the pixels A, B, C, D, . . . are equal to each other, and the luminosity of the light source varies by the integral number of times within the image pickup charge storage time period Tvds irrespective of the timings at which the pixels A, B, C, D, . . . are read out. Therefore, the sum of the light amount within the image pickup charge storage time period Tvds is equal among the pixels A, B, C, D, . . . .

Therefore, when an image of an image pickup subject portion having an equal light mount is picked up, the image pickup signals S1 obtained from the pixels A, B, C, D, . . . have an equal level, and no horizontal striped noise appears on the screen.

On the other hand, only with regard to the pixels in the light amount detection region 14, if the light amount detection charge storage time period is not equal to an integral number of times the cycle TLt of variation of the luminosity of the light source, then the light amount detection signal S2 varies in accordance with the cycle of variation of the luminosity of the light source. If the light amount detection charge storage time period is equal to an integral number of times the cycle TLt of variation of the luminosity of the light source, then the light amount detection signal S2 does not vary in accordance with the cycle of variation of the luminosity of the light source, from a principle similar to that described hereinabove with reference to FIGS. 6A to 7B.

Now, operation of the image pickup apparatus 100 of the present embodiment is described.

The control section 36 sends an instruction to the control circuit 20 to cause the control circuit 20 to set the light amount detection charge storage time period of the light amount detection region 14 so that it may not become equal to an integral number of times the cycle TLt of variation of the luminosity of the light source. More particularly, if the ac power supply frequency is 50 Hz or 60 Hz, then the light amount detection charge storage time period is set so as not to become equal to an integral number of times of 100 Hz or 120 Hz, which is an integral number of times the ac power supply frequency. In other words, the light amount detection charge storage time period is set so as to be different from a cycle equal to an integral number of times the cycle 1/100 sec or 1/120 sec.

The control circuit 20 switches the switch 16 once for each one frame to supply the image pickup signal S1 from the image pickup region 12 and the light amount detection signal S2 from the light amount detection region 14 to the signal processing section 30 through the same reading out path.

In this state, the control section 36 supervises a result of the detection obtained from the detection circuit 34. Then, if the control section 36 decides that the luminosity of the light source varies cyclically, then it issues an instruction to the control circuit 20 to set the image pickup charge storage time period Tvds to a value equal to an integral number of times the cycle TLt of variation of the luminosity of the light source. Particularly, such operation as just described is performed under such circumstances like, for example, under a fluorescent lamp.

On the other hand, if the control section 36 decides that the luminosity of the light source does not vary cyclically, then it issues an instruction to the control circuit 20 to make it possible to set the image pickup charge storage time period Tvds also to a time period other than a value that is not equal to an integral number of times the cycle TLt of variation of the luminosity of the light source. Particularly, such operation as just described is performed under such circumstances like, for example, under the sun.

As described above, according to the present invention, the image pickup charge storage time period Tvds of the image pickup region 12 of the solid-state image pickup device 10 and the light amount detection charge storage time period can be set independently of each other.

Accordingly, where the cycle of variation of the luminosity of light emitted from the light source is the variation cycle TLt fixed, the light amount detection charge storage time period is set to a value other than an integral number of times the variation cycle TLt, and it is decided whether or not the light amount detection signal S2 varies cyclically in the variation cycle TLt. If it is decided that the light amount detection signal S2 varies cyclically in the cycle variation TLt, then the image pickup charge storage time period Tvds is set to a value equal to an integral number of times the variation cycle TLt. Consequently, the sum of the light amount in the image pickup charge storage time period Tvds can be made equal among the image pickup pixels of the image pickup region 12.

Therefore, when image pickup is performed under a light source whose luminosity varies cyclically, horizontal striped noise can be prevented with certainty from appearing on the screen on which the image is formed.

Further, where the amplification factor of a gain amplifier for amplifying an image pickup signal is varied to correct the influence of the cyclic variation of the light source as in the related art, if the image pickup signal to be supplied to the gain amplifier is formed from a digital signal, the resolution of the image pickup signal is deteriorated by the amplification of the gain amplifier. Consequently, there is the possibility that the smoothness in gradation of an image formed from the image pickup signal may be degraded.

In contrast, according to the present embodiment, since the amplification factor of a gain amplifier is not used, there is no deterioration of the resolution of the image pickup signal, and this is advantageous in assurance of smoothness in gradation of an image formed from the image pickup signal.

Further, since, different from the related art, no correction of an image pickup signal by a gain amplifier is involved, the configuration is simple, and this is advantageous also in achievement of reduction of the cost.

Further, in the related art image pickup apparatus, where a solid-state image pickup device used is of the type which outputs an image pickup signal obtained by the same light exposure timing for each frame, since the amplification factor of the gain amplifier is adjusted for each frame, drop of the S/N ratio or drop of the resolution in a frame obtained with a reduced amount of light cannot be avoided. According to the present embodiment, however, drop of the S/N ratio and drop of the resolution of the image pickup signal can be prevented.

Further, according to the present embodiment, since the image pickup region 12 and the light amount detection region 14 are provided on the light receiving face 11 of the solid-state image pickup device 10, miniaturization of the solid-state image pickup device 10 and the image pickup optical system for introducing light to the solid-state image pickup device 10 can be achieved advantageously.

For example, where a lens forming the image pickup optical system has a circular shape and the image pickup region 12 has a rectangular shape, if the light amount detection region 14 is disposed in a dead space formed between an arcuate portion formed from a light flux introduced to the light receiving face 11 from the image pickup optical system and one side of the image pickup region 12, then there is no necessity to expand the light receiving face 11 of the solid-state image pickup device 10 or to increase the aperture of the image pickup optical system.

Second Embodiment

Now a second embodiment of the present invention is described.

Figure 8:
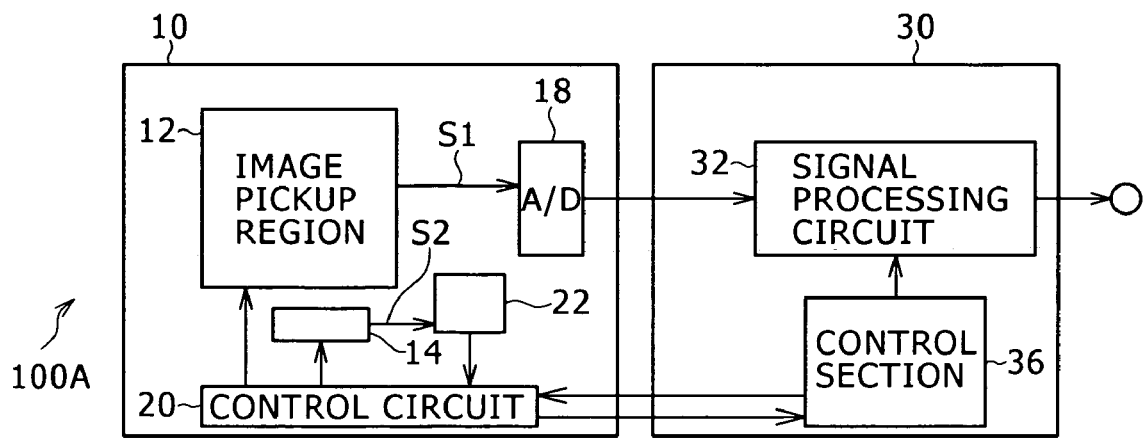
FIG. 8 is a block diagram showing an image pickup apparatus according to a second embodiment of the present invention.

FIG. 8 shows an image pickup apparatus 100A according to the second embodiment. The similar components of the second embodiment to the previously described components of the first embodiment are denoted by the same numbers.

Referring to FIG. 8, the control circuit 20 of the image pickup apparatus 100A controls reading out of the image pickup region 12 and the light amount detection region 14 and sets the image pickup charge storage time period and the light amount detection charge storage time period of the solid-state image pickup device 10 independently of each other.

The image pickup signal S1 read out from the image pickup region 12 is supplied to the signal processing circuit 32 through the A/D converter 18 and a signal line.

The light amount detection signal S2 read out from the light amount detection region 14 is supplied to a detection circuit 22.

The detection circuit 22 includes a band pass filter (BPF) having a pass band whose center frequency is, for example, equal to twice the power supply frequency. The control circuit 20 produces detection data representative of the magnitude of cyclic variation of a signal having passed through the detection circuit 22 and supplies the detection data to the control section 36. The supply of the detection data to the control section 36 is performed through a signal line interconnecting the control circuit 20 and the control section 36. Similarly as in the first embodiment described hereinabove, the detection circuit 22 is not limited to a detection circuit using a BPF, but various known circuits can be applied to the detection circuit 22.

The control section 36 decides based on the detection data whether or not the light source varies cyclically and performs control similar to that in the first embodiment.

Accordingly, while, in the second embodiment, the image pickup region 12 and the light amount detection region 14 are formed independently of each other, the image pickup signal S1 and the light amount detection signal S2 are outputted through different paths from each other by separate reading out operations from each other.

In the present embodiment, the control circuit 20, detection circuit 22, signal processing circuit 32 and control section 36 cooperatively form a control section. The control circuit 20, detection circuit 22 and control section 36 cooperatively form a setting section. The signal processing circuit 32 forms a signal processing section.

Further, a first path is formed from the signal line for transmission detection data corresponding to the light amount detection signal S2, and a second path is formed from the signal line for transmitting the image pickup signal S1.

Also the second embodiment having the configuration described above naturally achieves similar operation and effects to those of the first embodiment described hereinabove.

Further, according to the second embodiment, the image pickup signal S1 and the light amount detection signal S2 are not cut and divided with respect to time by the switch 16 so as to be successively supplied to the signal processing section 30. Therefore, according to the second embodiment, when compared with the first embodiment, the switch 16 can be eliminated, and this is advantageous in simplification of the configuration.

Further, the timing at which the detection data is to be supplied to the control section 36 and the timing at which the image pickup signal S1 is to be supplied to the signal processing circuit 32 can be set independently of each other, and this is advantageous in performing setting of the reading out time of the image pickup signal S1 freely. Further, for example, the detection data and the image pickup signal S1 can be supplied simultaneously (concurrently) to the signal processing section 30 or supply a plurality of detection data per one frame, and this is advantageous in assurance of the degree of freedom in design.

Third Embodiment

Now, a third embodiment of the present invention is described.

The third embodiment is different from the first and second embodiments in that reading out operation of the image pickup signal S1 from the image pickup region 12 and reading out operation of the light amount detection signal S2 from the light amount detection region 14 of the solid-state image pickup device 10 are performed successively in time.

Figure 9:
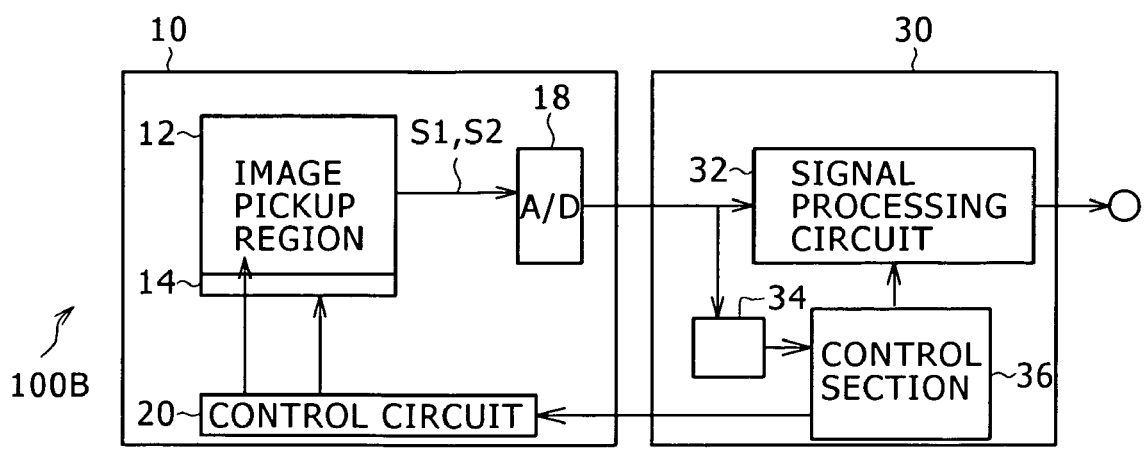
FIG. 9 is a similar view but showing an image pickup apparatus according to a third embodiment of the present invention.
Figure 10:
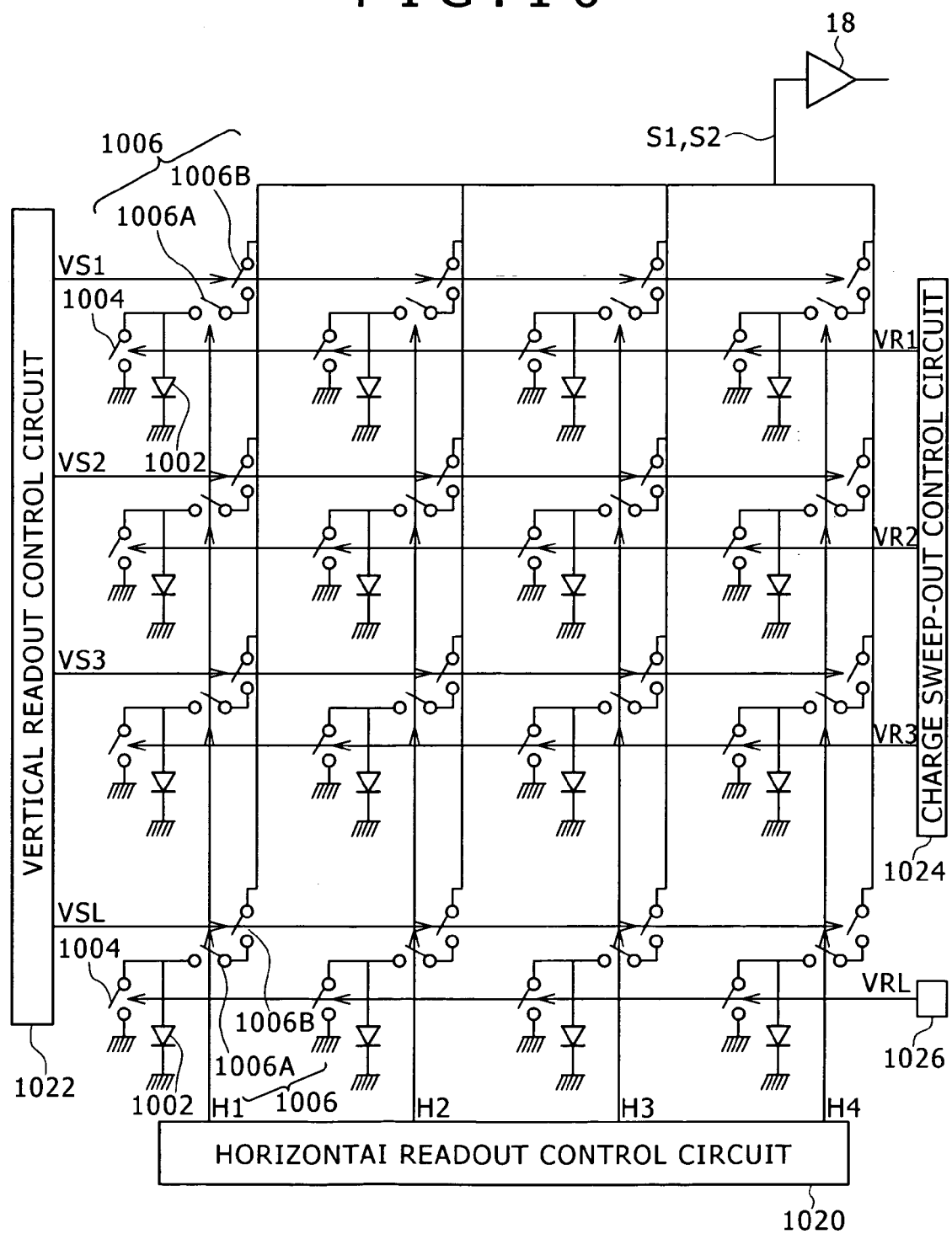
FIG. 10 is a circuit diagram showing a circuit configuration of an image pickup region and a light amount detection region in the image pickup apparatus of FIG. 9.
Figure 11:
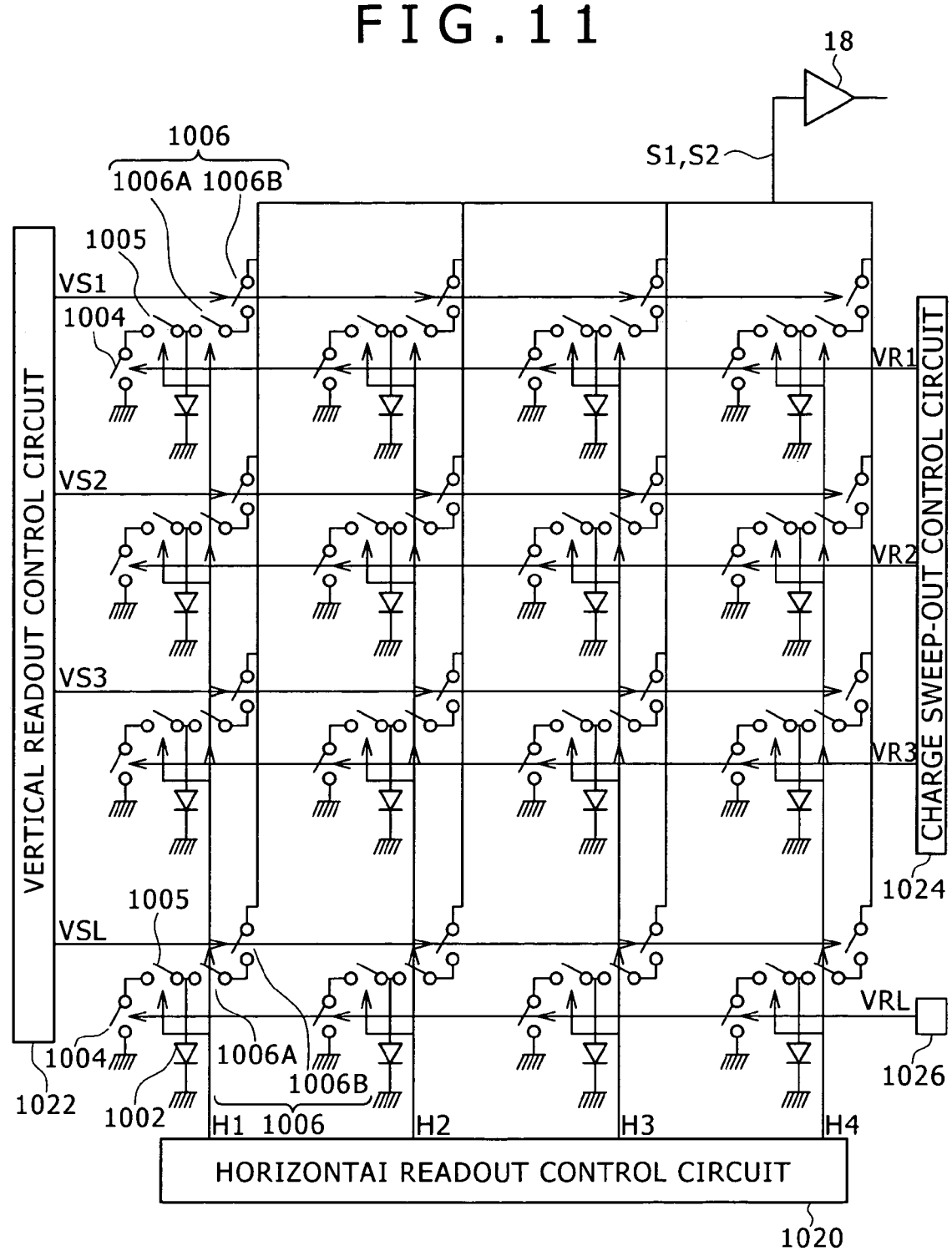
FIG. 11 is a similar view but showing another circuit configuration of the image pickup region and the light amount detection region in the image pickup apparatus of FIG. 9.

FIG. 9 shows a configuration of an image pickup apparatus 100B of the third embodiment, and FIG. 10 shows the image pickup region 12 and the light amount detection region 14 of the image pickup apparatus 100B.

Referring first to FIG. 9, the image pickup region 12 and the light amount detection region 14, which form the solid-state image pickup device 10, are scanned in accordance with an X-Y addressing method.

Referring now to FIG. 10, pixels are arranged in four vertical rows in the solid-state image pickup device 10, and the pixels in the upper three rows serve as effective region pixels of the image pickup region 12 while the pixels in the lower one row serve as light amount detection pixels of the light amount detection region 14.

The solid-state image pickup device 10 includes a horizontal readout control circuit 1020, a vertical readout control circuit 1022, an image pickup region charge sweep-out control circuit 1024, and a light amount detection region charge sweep-out control circuit 1026.

The horizontal readout control circuit 1020 successively places horizontal direction reading out control signals H1, H2, H3, and H4 into an on state individually for a fixed period of time from the left to the right in FIG. 10.

The vertical readout control circuit 1022 successively places vertical direction reading out control signals VS1, VS2, VS3 and VSL individually for a fixed period of time from above to below in FIG. 10.

Consequently, charge stored in the pixels in the image pickup region 12 and the light amount detection region 14 is successively read out one by one row and one by one column beginning the left upper portion toward the right lower portion of the matrix and is supplied as the image pickup signal S1 and the light amount detection signal S2 to the A/D converter 18.

The image pickup region charge sweep-out control circuit 1024 outputs sweep-out control signals VR1, VR2 and VR3 for controlling the image pickup charge storage time period for the image pickup region 12. The image pickup region charge sweep-out control circuit 1024 for the image pickup region successively places the sweep-out control signals VR1, VR2 and VR3 into an on state at a timing prior by the image pickup charge storage time period of the image pickup region 12 with respect to the timing at which the reading out control signals VS1, VS2, and VS 3 in the vertical direction are successively placed into an on state.

The light amount detection region charge sweep-out control circuit 1026 outputs a sweep-out control signal VRL for controlling the light amount detection charge storage time period for the light amount detection region 14. The light amount detection region charge sweep-out control circuit 1026 places the vertical direction reading out control signal VSL into an on state at a timing prior by the image pickup charge storage time period of the light amount detection charge storage time period for the light amount detection region 14 with respect to the timing at which the vertical direction reading out control signal VSL in the vertical direction is placed into an on state.

Accordingly, the horizontal readout control circuit 1020, vertical readout control circuit 1022, image pickup region charge sweep-out control circuit 1024 and the light amount detection region charge sweep-out control circuit 1026 operate to perform the reading out operation of the image pickup signal S1 and the reading out operation of the light amount detection signal S2 successively in time.

Further, the signal processing circuit 32 and the detection circuit 34 of the signal processing section 30 operate in synchronism with the reading out operation of the image pickup signal S1 and the reading out operation of the light amount detection signal S2.

Also in the third embodiment having the configuration described above, similar operation and effects to those of the first embodiment are achieved naturally.

Further, in the third embodiment, the reading out operation of the image pickup signal S1 and the reading out operation of the light amount detection signal S2 are performed but not independently of each other. Therefore, the third embodiment is advantageous in simplification of control of the control circuit 20.

Further, in the configuration of FIG. 10, the single charge sweep-out switch 1004 is provided for each one pixel, and the charge sweep-out switches 1004 of all of the pixels at the same position in the upward and downward direction are switched on by the same sweep-out control signals VR1, VR2, VR3 and VRL. Therefore, sweeping out of charge is performed at the same timing from all of the pixels that are at the same position in the upward and downward direction.

On the other hand, it is otherwise possible to provide another charge sweep-out switch 1005 in addition to the charge sweep-out switch 1004 for each pixel such that the charge sweep-out switches 1005 are switched on by the horizontal direction reading out control signals H1, H2, H3 and H4 of the horizontal readout control circuit 1020, then the sweeping out timings of charge of the pixels positioned at the same position in the horizontal direction can be made coincide with each other.

Further, also where the solid-state image pickup device is of the type wherein the entire screen area is read out at the same timing like a CCD unit, if it is configured in a manner similar to that illustrated in FIG. 9 such that two independent timings at which charge of the pixels is swept out are set, then the image pickup region 12 and the light amount detection region 14 can naturally be configured.

Figure 12:
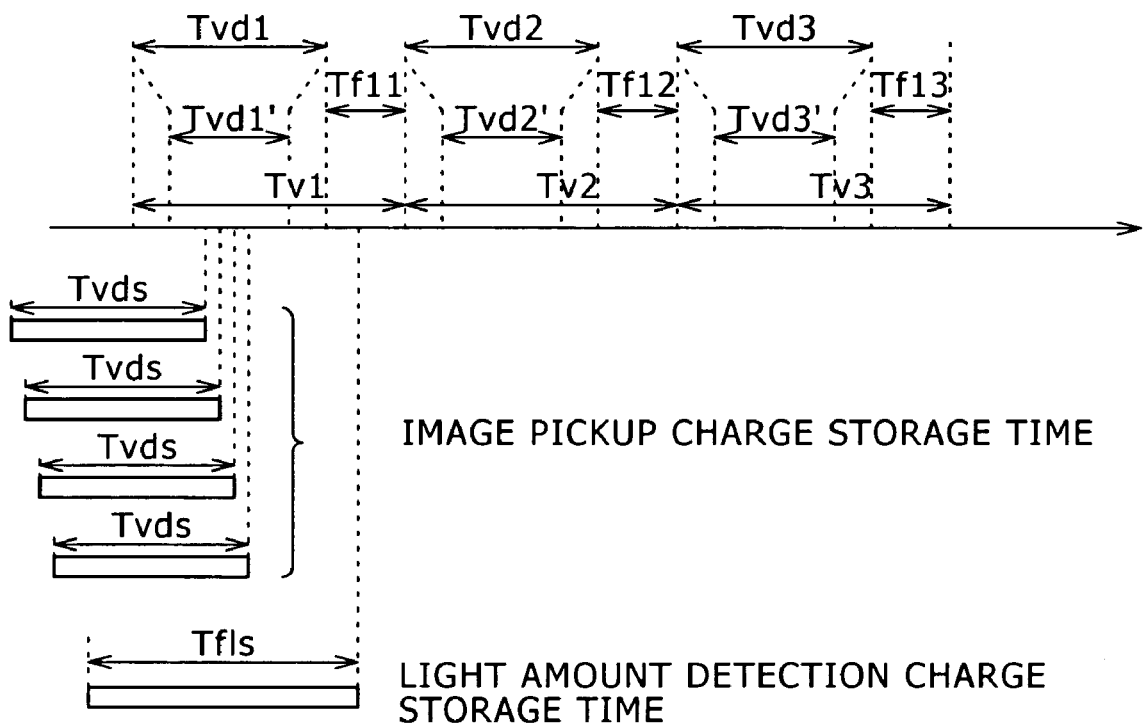
FIG. 12 is a diagrammatic view illustrating reading out timings of an image pickup signal and a light amount detection signal where the image pickup signal is read out from a restricted portion of the image pickup region of the solid-state image pickup device shown in FIG. 11 to implement an electronic zoom function of enlarging an image.

FIG. 12 illustrates reading out timings of the image pickup signal S1 and the light amount detection signal S2 where the image pickup region 12 of the solid-state image pickup device 10 is restricted partly to read out the image pickup signal S1 thereby to implement an electronic zoom function of enlarging an image.

Referring to FIG. 12, time periods within which the image pickup signal S1 is read out where the electronic zoom function is ineffective are represented by Tvd1, Tvd2, Tvd3, . . . , and time periods within which the image pickup signal S1 is read out where the electronic zoom function is effective are represented by Tvd1', Tvd2', Tvd3', . . . . As seen in FIG. 12, when the electronic zoom function is effective, the time within which the image pickup signal S1 is read out is shorter. Therefore, the shape of horizontal striped noise arising from a cyclic variation of the light source may possibly vary in response to whether the electronic zoom function is effective or ineffective.

However, according to the present embodiment, since the time periods Tfl1, Tfl2, Tfl3, . . . within which the light amount detection signal S2 is read out are fixed irrespective of whether the electronic zoom function is effective or ineffective, the reading out time of the light amount detection signal S2 is not influenced by the same.

Accordingly, appearance of such horizontal striped noise as described above can be prevented with certainty irrespective of whether the electronic zoom function is effective or ineffective.

It is to be noted that the embodiments described above are configured such that, when the cycle of variation of the luminosity of light emitted from the light source is a fixed variation cycle, the light amount detection charge storage time period is set to a period of time different from a period of time equal to an integral number of times the variation cycle and it is decided whether or not the light amount detection signal cyclically varies in the variation cycle. Then, if it is decided that the light amount detection signal cyclically varies in the variation cycle, then the image pickup charge storage time period is set to a period of time equal to an integral number of times the variation cycle. Consequently, the embodiments are advantageous in that, when image pickup is performed under a light source whose luminosity varies cyclically, appearance of horizontal striped noise on the picked up image can be prevented with certainty.

However, according to the present invention, the manner of setting is not limited to those of the embodiments described hereinabove, but the levels of an image pickup signal and a light amount detection signal can be corrected by setting the image pickup charge storage time period and the light amount detection charge storage time period independently of each other by various methods other than those of the embodiments described above.

While preferred embodiments of the present invention have been described using specific terms, such description is for illustrative purpose only, and it is to be understood that changes and variations may be made without departing from the spirit or scope of the following claims.

What is claimed is:

1. An image pickup apparatus, comprising:
   a solid-state image pickup device for photoelectrically converting light incoming to a light receiving face thereof to produce charge such that the charge is cumulatively stored in response to a charge storage time period set in advance and outputting a detection signal corresponding to the stored charge; and
   a control section for setting the charge storage time period,
   wherein said light receiving face of said solid-state image pickup device have an image pickup region from which a detection signal corresponding to an image of an image pickup subject formed from the light incoming to said light receiving face is outputted as an image pickup signal and a light amount detection region from which a detection signal corresponding to the amount of the light incoming to said light receiving face is outputted as a light amount detection signal,
   wherein the charge storage time period includes a charge storage time period of said image pickup region and a light amount detection charge storage time period which is a charge storage time period of said light amount detection region,
   wherein said control section setting the image pickup charge storage time period and the light amount detection charge storage time period independently of each other, and
   wherein the light amount detection charge storage time period starts at a fixed interval after the charge storage time period of said image pick-up region.

2. The image pickup apparatus according to claim 1, wherein,
   where the luminosity of light emitted from a light source has a fixed variation cycle, said control section sets the light amount detection charge storage time period to a period of time different from an integral number of times the variation cycle and decides whether the light amount detection signal cyclically varies in the variation cycle, and
   then if it is decided that the light amount detection signal cyclically varies in the variation cycle, then said control section sets the image pickup charge storage time period to a period of time equal to an integral number of times the variation cycle.

3. The image pickup apparatus according to claim 2, wherein, when it is decided that the light amount detection signal cyclically varies in the variation cycle, said control section can set the image pickup charge storage time period also to a period of time different from a period of time equal to an integral number of times the variation cycle.

4. The image pickup apparatus according to claim 1, wherein reading out operation of the image pickup signal from said image pickup region and reading out operation of the light amount detection signal from said light amount detection region are performed independently of each other.

5. The image pickup apparatus according to claim 1, wherein reading out operation of the image pickup signal from said image pickup region and reading out operation of the light amount detection signal from said light amount detection region are performed independently of each other,
   wherein said control section includes a switch for selecting one of the image pickup signal and the light amount detection signal, a setting section for setting the image pickup charge storage time period and the light amount detection charge storage time period based on the light amount detection signal inputted thereto through said switch, and a signal processing section for processing the image pickup signal inputted thereto through said switch to produce a video signal.

6. The image pickup apparatus according to claim 1, wherein reading out operation of the image pickup signal from said image pickup region and reading out operation of the light amount detection signal from said light amount detection region are performed independently of each other,
   wherein said control section includes a setting section for setting the image pickup charge storage time period and the light amount detection charge storage time period based on the light amount detection signal supplied thereto through a first path, and a signal processing section for processing the image pickup signal supplied thereto through a second path different from said first path to produce a video signal.

7. The image pickup apparatus according to claim 1, wherein reading out operation of the image pickup signal from said image pickup region and reading out operation of the light amount detection signal from said light amount detection region are performed successively in time.

8. The image pickup apparatus according to claim 1, wherein reading out operation of the image pickup signal from said image pickup region and reading out operation of the light amount detection signal from said light amount detection region are performed successively in time,
   wherein said control section includes a setting section for setting the image pickup charge storage time period and the light amount detection charge storage time period based on the light amount detection signal, and a signal processing section for processing the image pickup signal to produce a video signal.

9. The image pickup apparatus according to claim 1, wherein the variation cycle is equal to ½ the cycle of a commercial power supply.

10. The image pickup apparatus according to claim 1, wherein said solid-state image pickup device is a CMOS sensor unit or a CCD unit.

11. An image pickup method for an image pickup apparatus which includes a solid-state image pickup device for photoelectrically converting light incoming to a light receiving face thereof to produce charge such that the charge is cumulatively stored in response to a charge storage time period set in advance and outputting a detection signal corresponding to the stored charge and a control section for setting the charge storage time period, comprising:

a step of setting an image pickup charge storage time period and a light amount detection charge storage time period independently of each other;

wherein said light receiving face of said solid-state image pickup device have an image pickup region from which a detection signal corresponding to an image of an image pickup subject formed from the light incoming to said light receiving face is outputted as an image pickup signal and a light amount detection region from which a detection signal corresponding to the amount of the light incoming to said light receiving face is outputted as a light amount detection signal, wherein the charge storage time period including two time periods one of which is the an image pickup charge storage time period which is a charge storage time period of said image pickup region and the other of which is the light amount detection charge storage time period which is a charge storage time period of said light amount detection region, and wherein the light amount detection charge storage time period starts at a fixed interval after the charge storage time period of said image pick-up region.

12. The image pickup method according to claim 11, wherein, where the luminosity of light emitted from a light source has a fixed variation cycle, the light amount detection charge storage time period is set to a period of time different from an integral number of times the variation cycle and it is decided whether the light amount detection signal cyclically varies in the variation cycle, and then if it is decided that the light amount detection signal cyclically varies in the variation cycle, then the image pickup charge storage time period is set to a period of time equal to an integral number of times the variation cycle.

13. The image pickup method according to claim 12, wherein, when it is decided that the light amount detection signal cyclically varies in the variation cycle, the image pickup charge storage time period is set to a period of time different from a period of time equal to an integral number of times the variation cycle.

14. The image pickup method according to claim 11, wherein reading out operation of the image pickup signal from said image pickup region and reading out operation of the light amount detection signal from said light amount detection region are performed independently of each other.

15. The image pickup method according to claim 11, wherein reading out operation of the image pickup signal from said image pickup region and reading out operation of the light amount detection signal from said light amount detection region are performed successively in time.

16. The image pickup method according to claim 11, wherein the variation cycle is equal to ½ the cycle of a commercial power supply.

17. The image pickup method according to claim 11, wherein said solid-state image pickup device is a CMOS sensor unit or a CCD unit.

* * * * *